United States Patent
Gerstl et al.

(10) Patent No.: US 11,308,128 B2
(45) Date of Patent: Apr. 19, 2022

(54) REFINING CLASSIFICATION RESULTS BASED ON GLOSSARY RELATIONSHIPS

(71) Applicant: International Business Machines Corporation, Armonk, NY (US)

(72) Inventors: Peter Gerstl, Holzgerlingen (DE); Robert Kern, Karlsruhe (DE); Albert Maier, Tuebingen (DE); Thomas Schwarz, Stuttgart (DE); Oliver Suhre, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 15/837,788

(22) Filed: Dec. 11, 2017

(65) Prior Publication Data

US 2019/0179949 A1 Jun. 13, 2019

(51) Int. Cl.
*G06F 16/28* (2019.01)

(52) U.S. Cl.
CPC .......... *G06F 16/285* (2019.01); *G06F 16/282* (2019.01)

(58) Field of Classification Search
CPC .............................. G06F 16/282; G06F 16/285
USPC .................................................. 707/600–899
See application file for complete search history.

(56) References Cited

U.S. PATENT DOCUMENTS

| | | | |
|---|---|---|---|
| 8,126,890 B2 | 2/2012 | Bobick et al. | |
| 8,892,561 B2 | 11/2014 | Pandit et al. | |
| 9,076,152 B2 | 7/2015 | Khosravy | |
| 9,275,132 B2 | 3/2016 | Roberts et al. | |
| 9,430,549 B2 | 8/2016 | Guo et al. | |
| 9,582,490 B2 | 2/2017 | Simard et al. | |
| 2005/0080613 A1* | 4/2005 | Colledge | G06F 16/951 704/9 |
| 2005/0234953 A1* | 10/2005 | Zhang | G06F 16/3346 |
| 2006/0031217 A1* | 2/2006 | Smith | G06K 9/00711 |
| 2008/0104032 A1 | 5/2008 | Sarkar | |
| 2008/0115082 A1* | 5/2008 | Simmons | G06F 16/29 715/804 |
| 2008/0275694 A1* | 11/2008 | Varone | G06F 17/2785 704/9 |
| 2013/0246321 A1 | 9/2013 | Pandit et al. | |
| 2015/0019460 A1 | 1/2015 | Simard et al. | |
| 2015/0039623 A1 | 2/2015 | Pandit et al. | |

(Continued)

OTHER PUBLICATIONS

Iltache et al. "Using Domain Ontologies for Classification and Semantic Interpretation of Documents," The Second International Conference on Big Data, Small Data, Linked Data and Open Data, Lisbon, Portugal, Feb. 21-25, 2016, pp. 76-81.

*Primary Examiner* — Irete F Ehichioya
*Assistant Examiner* — Xiaoqin Hu
(74) *Attorney, Agent, or Firm* — Robert A. Voigt, Jr.; Shackelford, Bowen, McKinley & Norton, LLP (57) ABSTRACT

A method, system and computer program product for classifying a data collection of data of a predefined domain. A hierarchical representation scheme describing terms of the domain and one or more relationships between the terms is provided. At least one classifier may be applied on the data collection, resulting in a set of term assignments. Each term assignment of the term assignments associates a term candidate with a respective confidence value to the collection or to one or more data items of the collection. At least one of the term assignments may be refined based on the representation scheme and the set of term assignments.

20 Claims, 4 Drawing Sheets

(56) References Cited

U.S. PATENT DOCUMENTS

| | | | |
|---|---|---|---|
| 2016/0026621 A1* | 1/2016 | Misra | G06F 17/2785 |
| | | | 704/9 |
| 2016/0300271 A1* | 10/2016 | Scroggins, III | G06Q 30/0277 |
| 2017/0109424 A1 | 4/2017 | Oberhofer et al. | |
| 2017/0212953 A1 | 7/2017 | Oberhofer et al. | |
| 2018/0150454 A1* | 5/2018 | Sharma | G06F 16/353 |
| 2018/0357262 A1* | 12/2018 | He | G06F 16/2246 |

\* cited by examiner

| asset name / term | CTX | MC1 | DC1 | weighted average |
|---|---|---|---|---|
| CUST/CUSTOMER | | 0.8 | | 0.8 |
| CUST/CUSTOMER_ACCOUNT | | 0.5 | | 0.5 |
| ID/ID | | 1 | 0.9 | 0.95 |
| GENDER/GENDER | | 1 | 0.8 | 0.9 |
| AGE/NUMBER | | | 0.6 | 0.6 |
| AGE/AGE | | 1 | | 1 |
| AGE/PREMIUM_ACCOUNT_AGE | | 0.5 | | 0.5 |

REFINING CLASSIFICATION RESULTS BASED ON GLOSSARY RELATIONSHIPS

TECHNICAL FIELD

The present invention relates generally to digital computer systems, and more particularly to classifying a data collection.

BACKGROUND

The classification of data assets is an important discipline in support of data management, data science, and information governance. Proper classification is key to ensure an appropriate treatment of data assets. If not properly classified a data asset may not be found by a restrictive search, it may bypass governance policies because it is assumed not to qualify or it may not participate in data exploration since it was not recognized as being applicable.

SUMMARY

In one embodiment of the present invention, a computer-implemented method for classifying a data collection of data of a predefined domain comprises providing a hierarchical representation scheme describing terms of the domain and one or more relationships between the terms. The method further comprises applying at least one classifier on the data collection, resulting in a set of term assignments, each term assignment of the term assignments associating a term candidate with a respective confidence value to the collection or to one or more data items of the collection. The method additionally comprises refining, by a processor, at least one of the term assignments based on the representation scheme and the set of term assignments.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "hierarchical representation scheme" refers to a data structure for storing terms and indicating the relationships between the terms e.g. in accordance with a predefined hierarchy. The relationships may for example be semantic relationships between terms. The relationships between terms may for example comprise inheritance (e.g. parent and child) relationships and/or associative relationships in accordance with the hierarchy. The inheritance relationship between terms A and B may be referred to as a "is-a relationship" between A and B. For example "A is-a B" or "A has an is-a relationship with B" means that B is an ancestor of A in the hierarchy. B might be the parent, or any other term on the path from A to the top of the hierarchy e.g. root node. The associative relationship between terms A and B may be referred to as a "has-a relationship" between A and B. For example, "A has-a B" or "A has a has-a relationship with B" means that B is part or is a composition of or associated with A. The associative relationships may not form part of the hierarchy of the hierarchical representation scheme in that it may connect nodes from different paths of the hierarchy e.g. two nodes on the same path of the hierarchy may not be related with an associative relationship. "B is a subterm of A" means that A is a term on the path between the term B and the root of the tree. "B is a superterm of A" means that B is a term on the path between the term A and the root of the tree.

The hierarchical representation scheme may represent or implement a glossary, taxonomy and/or an ontology of terms of a predefined one or more domains.

A 'term' refers to a word or a combination of words. For example, a term may be a noun or compound noun. As other examples, a term can be any other word or combination of words, where the word(s) can be a noun, a compound noun, an adjective, a verb, and so forth. The term may be an indication of a type or an attribute or a property describing content of data. For example, if the data is a column comprising birth dates, the term "date" may be used to describe the content of that data may be "date" etc.

The term "data collection" or "data asset" refers to a collection of data which may be physically and/or logically grouped together. The data collection may be implemented in a single data storage medium or in physically separated data storage media being operatively linked to each other. The data collection may comprise one or more data tables, data sets, files and/or folders. The term "data table" or "table" or "data set" as used herein refers to data that may be presented in tabular form. Each column in the data table may represent a particular variable or attribute. Each row in the data table may represent a given member, record or entry of the data table.

The present method may enhance the term assignments resulting from the at least one classifier by taking advantage of the term hierarchy and the relationships present in the hierarchical representation scheme. For example, the at least one classifier may comprise at least one of data-based (also called syntactic) and metadata-based classifiers. The data-based classifier may for example involve an algorithm which parses the shape of the data stored e.g. in a column based on a regular expression. However, in the case of date or number columns for example, the at least one classifier may provide a classification which might not be sufficiently specific for a certain task at hand due to the lack of a syntactic clue which would help to derive a more specific result. For example, the data-based classifier may be able to determine a locale specific date format, but it may not distinguish a birth date from a purchase date. The meta-data based classifier may be able to identify a column as representing a birth date by using the name of the column. However, length constraints of the database or a preference for short names might prevent comprehensive names from being used. Thus, by running the refining of the present method the classification that results from the at least one classifier may be improved e.g. may become more specific. The present method may combine the results of individual classifiers of the at least one classifier with the knowledge stored in the hierarchical representation scheme (e.g. a glossary of terms) to derive more specific classification results referred to as term assignments.

According to one embodiment, the refining comprises: using the term candidate assigned to the collection for determining a set of assignable terms to the collection from the representation scheme; determining from the representation scheme supporting terms ST that are related to the assignable terms; identifying each data item of the collection DS that can be assigned to a term of the supporting terms using the set of term assignments, and providing a set of term assignments STA(DS, ST) of the identified data items; refining the term assignment of the collection using the set of term assignments of the identified data items.

If the data collection comprises multiple data sets, wherein each data set comprises respective data items, the method of this embodiment may be repeated for each data set of the data collection. This embodiment may enable an efficient specified term assignment. It may be efficient in that the assignment is limited to specific terms that are related to the term candidates of the previous classifiers. This may save processing resources that would otherwise be required for processing all terms of the hierarchical representation scheme.

According to one embodiment, determining supporting terms of a given assignable term comprises: determining first set of terms comprising terms having a parent inheritance relationship with the given assignable term, the first set of terms further comprises the assignable term and for each first term of the first set determining a second set of terms related to the first term by an associative relationship, wherein the supporting terms comprise the second sets of terms. The first set of terms are ancestors (e.g. parent) of the given assignable term. Each of the first terms has a has-a relationship with respective second set of terms (e.g. the first term has-a the second set of terms). This embodiment may further improve the terms assignments as the refinement is based on supporting terms determined using the whole path between the given assignable term and the root of the hierarchical tree. For example, this may enable to cover subterms of an ancestor of the given assignable term, which may be a valid specification of the given assignable term although they do not belong to its child terms.

According to one embodiment, the parent inheritance relation is a single inheritance relation being an is-a relationship. This may provide a balance between saving processing resources and improved term assignments.

According to one embodiment, the associative relationship indicates that the first term has an has-a relationship with the second term. This embodiment may seamlessly be integrated with existing tree structures.

According to one embodiment, the set of assignable terms comprise the candidate term and terms having a child inheritance relationship to the candidate term. For example, the candidate term may be the ancestor of the remaining terms of the assignable terms. Choosing the child terms may further specify and thus improve the classification of the data.

The set of terms assignments may for example be combined CTA. The combination may be performed such by identifying term assignments having same pairs (data, term) and may combine their respective confidence values for obtaining a combined confidence value. According to one embodiment, identifying a data item, DI, of the collection that can be assigned to a term T of the supporting terms using the combined set of term assignments, CTA, comprises calculating a joint confidence $JC1(DI, T)$ of all term assignments, $<DI, Y, C>$, where $Y=T$ or Y is a term having an is-a relationship with T or Y is a term such that T has an is-a relationship with Y, where $JC1(DI, T)=MAX(C, <DI, Y, C>$ in CTA), where $<DI, Y, C>$ refers to the assignment of term Y of the representation scheme to data item DI with a confidence value C, where MAX refers to a maximum of the confidence values C of term assignments $<DI, Y, C>$ that are part of the combined set of terms assignments CTA. This embodiment may enable an efficient and improved term assignment. It may provide a systematic method for automatically running the present method.

According to one embodiment, the refining comprises: for each term TDS of the assignable terms computing a confidence value CDS that the term TDS is assignable to the collection DS, wherein the computing is performed using the following formula: $CDS=(SF(DS, TDS)+B1*AVG(C$ where $<DI, TDI, C>$ in $STA(DS, TDS))/(1+B1)$ for any term TDI, wherein AVG refers to an average of the confidence values C of the terms assignments that belong to STA(DS, TDS), where SF(DS, TDS) is the support factor specifying how many data items DI of the collection DS have terms assigned which support TDS: $SF(DS, TDS)=NUM(DI$ in DS where $<DI, T, C>$ in STA(DS, TDS) for any T and $C>0$)/ NUM(DI in DS).

According to one embodiment, the representation scheme comprises an ontology tree providing an ontology of the domain describing the terms and the hierarchy of the terms. Using the ontology may further improve the data classification as it may provide a larger sample of terms based on their semantic property.

According to one embodiment, the at least one classifier comprising multiple classifiers, the method further comprising: identifying in the set of term assignments a subset of term assignments having each a same given data and same given term assigned to the given data, combining the confidence values of the subset of term assignments for providing a combined term assignment assigning the given term to the given data with the combined confidence value, wherein the refining is performed on at least part of the combined term assignments. The term assignments used or refined in the refining step comprises the combined term assignments. Combining the terms assignments before refining them may further improve the classification results of the present method. The more classifiers used the more improved classification may be obtained.

According to one embodiment, combining the confidence values comprises: assigning a weight to a classifier of a respective term assignment of the subset of term assignments and performing a sum of the confidence values weighted by respective weights. The weights may for example be user defined. This may further improve the classification results of the present method.

According to one embodiment, the method further comprises: providing a training set comprising known term assignments of terms to data; applying a machine learning on the training set for generating a model that predicts a weight of a classifier based on the term assigned by the classifier to a given data; using the generated model for determining the weights used for calculating the combined confidence value. This may enable systematic method for weighting the classifiers and may thus speed up the process of the classification in particular for large data samples.

The weights of the classifiers may for example be adjusted as follows: if a certain number/distribution of manual term assignments is present in the set of term assignments these can be taken as a training set for a machine learning algorithm that determines the function W(CL) which maps classifiers to weights. The machine learning algorithm may adjust weights such that combined confidence values balance the strengths and weaknesses of the individual algorithms to obtain maximum value for the consumer of term assignments. Term assignments comprising the training set for a machine learning algorithm might be the term assignments that have been created manually. Alternatively or in addition term assignments comprising the training set for a machine learning algorithm might be term assignments having a confidence higher than a predefined minimum confidence value. The manual term assignments may comprise user defined assignments.

The term "machine learning" refers to a computer algorithm used to extract useful information from training data by building probabilistic models (referred to as machine learning models or machine learning models) in an automated way. The machine learning may be performed using one or more learning algorithms such as linear regression, K-means etc.

A "model" may for example be an equation or set of rules that makes it possible to predict an unmeasured value (e.g. which tag corresponds to a given token) from other, known values.

According to one embodiment, the refining is performed in case at least one of the following prerequisite conditions are fulfilled: changes of the data collection have a predefined minimum amount of changes, wherein the data collection results from changes applied to a previous data collection processed by the present method; the presence of a predefined metadata required by the refining step; the presence of an associative relationship such as a has-a relationship in the hierarchical representation scheme; the presence of the set of term assignments. This may save processing resources that would otherwise be required by unnecessary execution of the refining step. According to one embodiment, the refining may be performed in response to detecting a change in the set of term assignments and/or in response to determining that the hierarchical representation scheme is changed.

According to one embodiment, each classifier of the at least one classifier is applied on a respective portion of the data collection.

According to one embodiment, the method further comprises: combining the refined term assignment with the at least one term assignments for providing a combined term assignment. The set of term assignments that results from the application of the at least one classifier may be stored in a metadata repository. For example, the refined term assignment may be stored in the metadata repository and may thus be part of the (updated) set of term assignments. The updated set of term assignments may be combined as described above.

According to one embodiment, the method further comprises adding the terms assignments resulting from the refining step to the set of term assignments, resulting in a modified set of term assignments. The method further comprises repeating the combining and refining steps using the modified set of term assignments and the adding step until the difference between confidence values of the combined term assignments of the current iteration and the previous iteration is smaller than a predefined threshold.

These embodiments may enable to provide an improved term classification.

Figure 1:
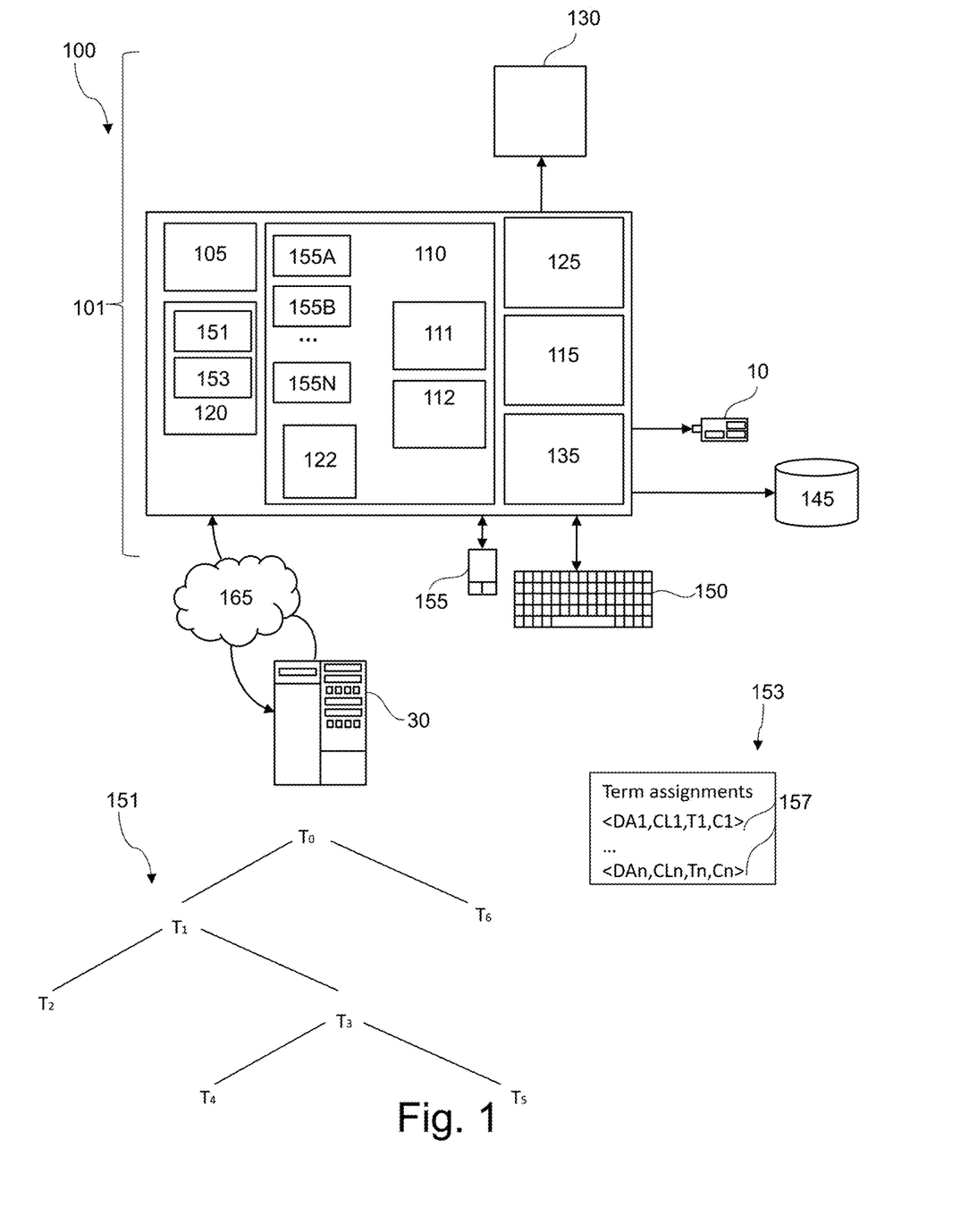
FIG. 1 represents a computerized system, suited for implementing one or more method steps as involved in the present disclosure in accordance with an embodiment of the present invention.

FIG. 1 represents a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 and/or memory 110 may comprise a hierarchical representation scheme 151 such as an ontology. The ontology may be a formal naming and definition of the types, properties, and interrelationships of the entities that exist in a particular domain of discourse. The hierarchical representation scheme may be provided in the form of (or stored in) a hierarchical tree structure 151 that describes terms of one or more domains and one or more relationships between the terms. For example, the hierarchical tree structure may comprise glossary of terms consisting of a hierarchy which is formed by is-a relationships and additional acyclic relationships such as has-a relationships. The has-a relationship may be a placeholder for a class of directed relationships with the semantics of one term contributing to or belonging to another term. For example, a contract may have an underwriter and an issuer of securities. The relationships representing 'is_underwriter_of' and 'issuer_of_securities' may be treated as instances of a more generic class related to by a has-a relationship.

FIG. 1 illustrates an example of the hierarchical tree structure 151 comprising terms T0-T6 and indicating the relationships between the terms T0-T6. For example, T0 is the root of the tree. T1 has an is-a relationship with T0 and T2 has an is-a relationship with T1 and T0 etc. Another example of the hierarchical tree structure is described with reference to FIG. 4A.

The memory 110 may further comprise one or more classifiers 155A-N. The classifiers may or may not be part of software 112. Each of the classifiers 155A-N may use a respective method that assigns terms (e.g. T1-T6) to data sets and data items with a confidence value or confidence level. The confidence value may be a number in the range [0, 1]. The confidence value may represent the classifier's trust in the quality of the respective classification result. For example, the classifiers may be selected by a user based on the quality of each classifiers. For example, the confidence value may indicate an algorithm-specific 'distance' between the data and the respective assigned term in the range of 0 to 1. The classifiers 155A-N may for example comprise at least one of: a classifier performing manual assessment of a classification result which leads to a refinement and/or correction of confidence values, a classifier that uses data based algorithms that are implemented by regular expressions or data-based similarity metrics, a classifier using metadata based algorithms that take advantage of a data's metadata which may be present as markup, accessible through a connection to the data's storage mechanism, or stored in a metadata repository 153. Examples of metadata may comprise column name, a description, or a statistical model representing the data's content. The classifiers 155A-N may further comprise classifiers using approaches such as machine learning and heuristics to assign terms to data. For example, the classifier performing manual assessments may be configured to prompt a user e.g. a domain expert for classifying the data in accordance with a predefined mode of classification and may in response receive classification results from the user. The mode of classification may for example require that the user uses the combined results of other classifiers and adjusts their confidence values or adds/deletes assignments in order to provide an improved set of term assignments 157 that can further be used by the present method (e.g. in step 202 described below).

The metadata in the repository 153 may be configured to store term assignments that result from the application of at least part of the classifiers 155A-N on one or more data collections. For example, the at least part of the classifiers 155A-N comprises classifiers having fulfilled one or more prerequisite conditions for assigning terms to the one or more data collections. FIG. 1 shows an example structure of the term assignments (collectively referred to by reference number 157) of the metadata repository 153. Each of the term assignments 157 may indicate the data, the classifier being applied, the term assigned to the data and the associated confidence value. The term assignments 157 may each be structured in the form of a tuple <DA, CL, T, C> where DA is a reference to the data processed or classified, CL is a reference to the classifier (e.g. algorithm used, version number and algorithm's configuration), T is a reference to the term assigned to data DA, C is a numeric confidence value e.g. $0<=C<=1$. For example, <DA, CL, T, 0> means that classifier CL rates the assignment of T to DA as a bad choice, C=0.

In addition to classifiers 155A-N, a classifier (referred to as 'MAN') using a manual assignment of terms to data based on inputs of a user such as a domain expert (e.g. having a confidence=1), may be used to classify the one or more data collections. For example, the classifier performing manual assessments may be configured to prompt a user for classifying the data in accordance with another mode of classification and may in response receive classification results from the user. The mode of classification may for example require that the user classify the data without knowing the results of other classifiers. The received classification results may be combined with or added to the classification results of the other classifiers. In one example, the received classification results from the user may be used to replace other assignments with the same data-term pair. This may provide an improved set of term assignments 157 that can further be used by the present method (e.g. in step 202 described below).

Figure 2:
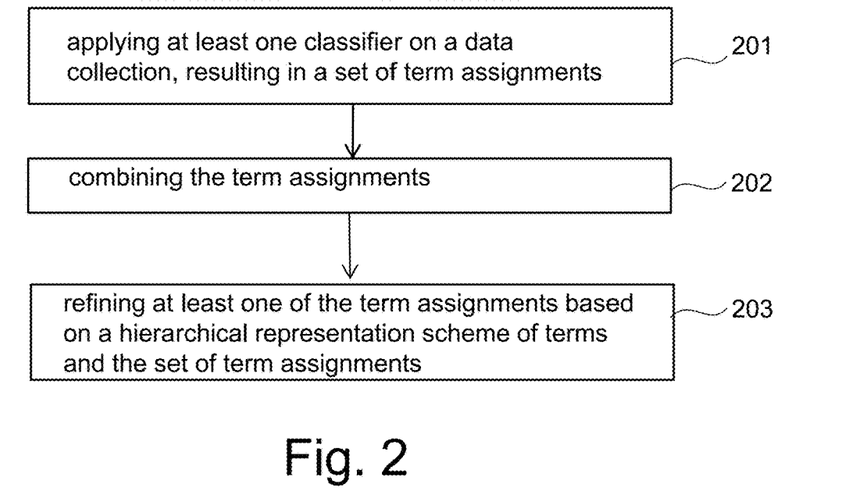
FIG. 2 is a flowchart of a method for classifying a data collection in accordance with an embodiment of the present invention.

FIG. 2 is a flowchart of a method for classifying a data collection of data of a predefined domain. The data collection may for example be a collection of one or more data sets comprising data items. A data set can be a collection of one or more tables or files represented by a database or directory. For example, the data set may be a data table or a CSV file. The data items may for example be columns stored in a table. In another example, a data set may comprise a file comprising tables, bullets, sections, or other means of structural grouping of related content where these groupings may be the data items.

In step 201, at least one classifier of the classifiers 155A-N may be applied on the data collection. This may result in a set of term assignments 157, wherein each term assignment of the term assignments associates a term candidate with a respective confidence value to the data collection or to one or more data items of the data collection. The application of each of the at least one classifier 155A-N may not be based on results of other classifiers of the at least one classifier 155A-N. The at least one classifier 155A-N may for example be applied in parallel. If for example, the data collection comprises a data table, the set of term assignments 157 may comprise a term assigned to the data table and term assigned to each column of the table. The set of term assignments 157 may be stored in metadata repository 153 and/or provide to a user. The term "user" may refer to an entity e.g., an individual, a computer, or an application executing on a computer.

Step 201 may for example be executed automatically upon receiving the data collection e.g. upon storing the data collection. In another example, step 201 may be executed upon receiving a request from the user for classifying the data collection. A classifier of the at least one classifier may be applied on the whole or part of the data collection. For example, a classifier may be executed to classify the data table only and another classifier may be executed to classify the columns of the data table.

For example, a classification request may be triggered by the user e.g. via a user interface by clicking on a button representing a classification function. In another example, the classification request may automatically be triggered if a new data asset is identified as being relevant for a data-driven activity that relies on classified data. An example of such an activity might be a data scientist's exploration of data stored in a data lake. In this case adding a data asset to the data lake may trigger a classification request to enrich the available metadata with insights how data assets relate to the terms in the glossary of the ontology (e.g. stored in the hierarchical tree structure 151).

The at least one classifier to be applied in step 201 may be selected from the classifiers 155A-N. The at least one classifier may for example be selected by the user. In another example, the at least one classifier may be selected if they fulfill a prerequisite condition check. Classifiers 155A-N may have additional dependencies which need to be checked prior to execution. Depending on the outcome of this check a classifier participates in execution of step 201 on all data, on a subset of the data, or not at all. Examples of such dependencies are:
  i. constraints on data. For example, a classifier may be selected if a certain amount of changes in the data collection is occurred since the classifier has last run,
  ii. constraints on metadata: a classifier may be selected based on the presence or absence of certain metadata required for term assignments by the classifier.

The at least one classifier to be applied in step 201 may be selected based on whether the constraint i. and/or ii. is fulfilled.

The execution of the at least one classifier may be performed or invoked in any order e.g. in parallel.

The term assignments 157 resulting from step 201 may be referred to as TA as well. The term assignments 157 may for example be combined in an optional step 202 for an improved assignment of data to terms. Step 202 may for example automatically be executed in response to a change in the content of the metadata repository 153 e.g. a new term assignment is added to the metadata repository. In one example, combined term assignments (CTA) may be computed using the terms assignments TA as follows.

The data and the terms that are indicated in the term assignments TA may be identified. And for each combination of data DA and term T in TA, term assignment <DA, T, C> may be added to CTA using the term assignments of TA<DA, CL_i, C_i> that assign T to DA. The term assignment of the CTA may be structured in the form of a tuple <DA, T, C> where DA is a reference to the data processed, T is a reference to the term assigned to DA, C is a numeric confidence value e.g. $0<=C<=1$, which can be defined as follows:

C=C1 if <DA, CL1, T, C1> in TA and if there is no <DA, CL2, T, C2> in TA with C1 different from C2 (e.g. there is only a single assignment for this data-term combination); otherwise C=0 if a term assignment <DA, 'MAN', T2, C2> is part of TA and representing the manual assignment by classifier MAN of term T2 to the data DA where T2 is not T and C2 is any value; otherwise C=SUM(PC_i(CL_i)*C_i*W(CL_i) for all <DA, CL T, C_i> in TA)/(SUM(W(CL_j) for all classifiers CL_j for which PC_j(CL_j)>0)), where PC_i(CL_i) represents the prerequisite check for classifier CL_i of the classifiers 155A-N.

PC_i(CL_i) is equal to 1 if classifier CL_i passes the check and 0 otherwise. For example, PC_i(CL_i)=1 for each of the at least one classifier that have been applied in step 201.

1/(SUM(W(CL_j)) is a corrective factor which adjusts the result domain to $0<=C<=1$ for classifiers that did not pass the prerequisite check.

For example, if the manual assignment of a term to a data asset DA exists the results of classifiers 155A-N may explicitly be neutralized by setting the confidence value of the respective combined term assignment of the data asset DA to 0.

In step 203, at least one of the term assignments that resulted from step 201 may be refined based on the hierarchical representation scheme 151 and the set of term assignments 157. For example, it may be determined based on the hierarchy of terms in the hierarchical representation scheme and the context of the classified data whether to further specify one or more classification of the set of term assignments 157. For example, the context of the classified data of the set of term assignments 157 may be defined by the structure of the data collection. For example, if the data collection is classified as 'Person' and the relationships in the hierarchical representation scheme 151 indicates Person *has-a* Birth date, the classification may be improved for a column of the data collection using the Birth date.

The refining step 203 may for example be part of or may be implemented by a contextual classifier. The execution of the contextual classifier may be performed based on whether at least one of the following two pre-conditions are fulfilled. The first pre-condition may require the presence of a term hierarchy with has-a relationships e.g. in the hierarchical tree structure 151. The second pre-condition may require the presence of term assignments created by other classifiers. In addition, the constraints i and ii may be used as additional prerequisites for the contextual classifier of the classifiers 155A-N. For example, the contextual classifier may be invoked when all other classifiers executed in step 201 have completed execution to ensure term assignments representing the current state of the overall system are present in the metadata repository 153.

If for example two classifiers CL1 and CL2 are executed in step 201 on data collection DA, the respective term assignments <DA,CL1,T1,C1> and <DA,CL2,T2,C2> may be obtained. T2 may be the same or different from T1. At least one of these two term assignments may be refined in accordance with the present method in order to obtain term assignment <DA,CL3,T3,C3>, where CL3 refers to the contextual classifier that performs the refining step 203. T3 may be same or different from T1 or T2. If the term assignments <DA,CL1,T1,C1> and <DA,CL2,T2,C2> (e.g. in case T2=T1) are combined in step 201 as described above the refinement may be performed on the combined term assignment.

In one example, the terms assignments <DA,CL1,T1,C1>, <DA,CL2,T2,C2> and <DA,CL3,T3,C3> may be combined, if for example T1=T2=T3, and the combined result may be provided to the user. The combined term assignment may map the confidence values C1, C2 and C3 of individual classifiers to a single combined value based on classifier specific weights W_1, W_2 and W_3. Classifier-specific weights W_1, W_2 and W_3 account for the fact that classifiers have different strength and weaknesses. Initially weights may for example be evenly distributed across the available classifiers. If, for example, the application requesting the classification results has a feedback loop (e.g. if users assign classes manually) the feedback can be used to adjust weights such that the combination of classifiers the results of which match the user's selection more frequently get a higher weight than the others.

In another example, the terms assignments <DA,CL1,T1,C1>, <DA,CL2,T2,C2> and <DA,CL3,T3,C3>, e.g. if T1, T2 and T3 are different may be ranked in accordance the confidence values and a ranked set of term candidates T1-T3 may be provided. The result of the refining step 203 may be term assignments that are determined based on the hierarchy of terms in the hierarchical representation scheme and the context of the classified data. These resulting term assignments may be referred to as contextual term assignments. In one example, the contextual term assignments may be added (e.g. as part of step 203) to the term assignments TA by storing the contextual term assignments in the metadata repository 153 e.g. this results in a new or modified content of the term assignments TA. And steps 202-203 may be repeated using the updated or modified term assignments TA. The repetition of steps 202-203 may be performed until: the difference between confidence values of each combined term assignments of respective iterations is smaller than a predefined threshold, and/or more than X iterations have been performed where X is the length of the longest is-a-path (of is-a-relationships) in the hierarchical tree structure 151. This guarantees the loop termination. Each repetition of step 202 would use the current content of the metadata repository (i.e. current TA).

Figure 3:
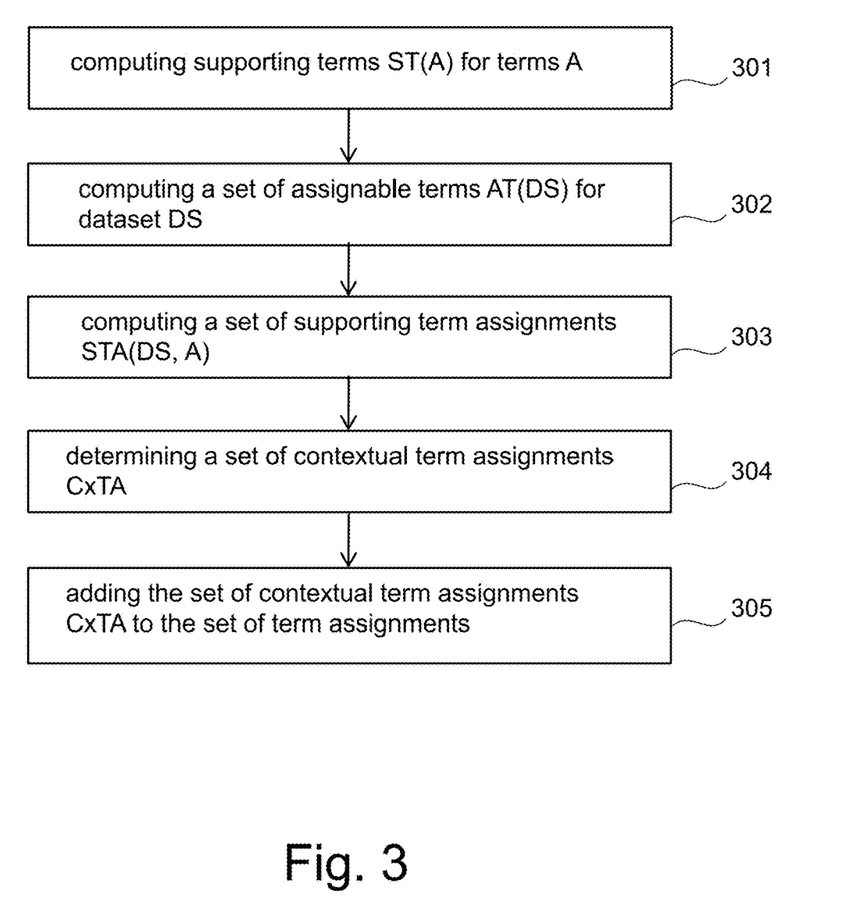
FIG. 3 is a flowchart of an example method for refining term assignments in accordance with an embodiment of the present invention.

FIG. 3 is a flowchart of an example method, for refining the term assignments 157 of a data collection, further detailing step 203. The data collection may comprise multiple data sets DS and each data set DS may comprise data items DI.

The hierarchical tree structure 151 may for example comprise a root node and subtrees of children with a parent node, represented as a set of linked nodes. Each node of the hierarchical structure may comprise a term. In the following description of the contextual classifier, the following annotations are used.

ROOT is a technical term which is the parent (root node) of all terms in the hierarchical tree structure. The term ROOT may not be assigned to data.

For simplification purpose, expressions 'A *is-a* B' and 'A is-a B' may be used for describing and distinguishing single inheritance relationships from multiple inheritance relationships. Expression 'A *is-a* B' for terms A and B means that A is a child of B in the hierarchical tree structure 151. Expression 'A is-a B' for terms A and B means that B is an ancestor of A in the in the hierarchical representation scheme 151. B might be the parent of A, or any other term on the path from A to ROOT.

In step 301, which may be an initialization step, supporting terms ST(A) may be computed for each term A (except term ROOT if present in the hierarchical tree structure 151) of at least part of the hierarchical tree structure 151. The set of supporting terms for A is a set of terms that are children of term A or children of any superterm of A on the path from A up to but excluding the term ROOT taking A owns X as a special case of A *has-a* X.

ST(A) may be defined as follows: ST(A)=the set of terms Y such that (A==X or A is-a X) and X *has-a* Y for any term X; and ST(A)={ } if no term Y exists. For example, the hierarchical representation scheme 151 may define a 'decision' as an act requiring a certain 'approval'. And, a 'corporate decision' is a special type of 'decision'. The term 'approval' is in the supporting terms of term 'corporate decision', ST('corporate decision') because 'corporate decision' is-a 'decision' and 'decision' *has-a* 'approval'.

The supporting terms ST(A) may be computed for a given term A if this computation has not been done before or if *is-a* or *has-a* relationships involving the given term A have changed since the last computation of ST(A).

In step 302, a set of assignable terms AT(DS) may be computed for each data set DS of the data collection. The set of assignable terms AT(DS) of data set DS comprises the set of terms assigned to DS plus the subterms of these terms:

AT(DS)=the set of terms Y where <DS, X, C> is part of CTA with C>0 and (X==Y) or Y is a X for any term X. CTA are the combined term assignments resulting from step 202.

The set of assignable terms serves as the domain of term assignments for a data set. It includes the subterms which may provide a more specific classification result. For example, the hierarchical representation scheme 151 may define 'date of birth' and 'shipment date' as subterms of 'date'. If a data set ds has been classified as a 'date' (e.g. <DS, 'date', C> is part of CTA with C>0) then AT(ds) contains 'date', 'date of birth' and 'shipment date'.

In step 303, a set of supporting term assignments STA (DS, A) may be computed for each combination of a data set DS with a term A that is assignable to DS (i.e. A is part of AT(DS).

STA(DS, A) may comprise the set of term assignments <DI_j, Y, C> between data items DI_j of dataset DS and terms Y which are supporting terms of term A which are assignable to dataset DS, where C>0 is the joint confidence of all assignments of terms and their subterms to DI_j. In other terms, <DI_j, Y, C> is part of STA(DS, A) if the following conditions are fulfilled: DI_j is part of DS and A is part of AT(DS) and Y is part of ST(A) and C=JC(DI_j, Y)>0. JC(DI, T) is the joint confidence of all term assignments of T and of subterms of T to DI.

Examples of the joint confidence JC(DI, T) may be defined as follows.

In one example, the joint confidence JC1(DI, T) may be the maximum confidence value of all superterms and subterms of term T that are assigned to data item DI: JC1(DI, T)=MAX(C, <DI, Y, C> in CTA where Y==T or Y is-a T or T is-a Y).

In another example, the joint confidence JC2(DI, T) may be the average confidence value of all superterms and subterms of term T that are assigned to DI: JC2(DI, T)=AVG (C, <DI, Y, C> in CTA where Y==T or Y is-a T or T is-a Y).

In another example, the joint confidence JC3(DI, T) may be the average of the maximum confidence values for each term assigned to data item DI on the path from a leaf term through term T to the root of the hierarchical tree structure 151: JC3(DI, T)=AVG(MAX(C, <DI, Y, C> in CTA for Y in {Y(1), Y(2), ..., Y(n)} where Y(n) *is-a* ROOT, T=Y(j) for a 1<=j<=n and Y(i+1) *is-a* Y(i) for i=1 ... n-1).

JC1 and JC2 may be easy to compute and may be sufficient in most cases. JC3 may have the advantage that it treats each path for which term assignments exist separately which may appear more natural.

The set of supporting term assignments combines the notion of supporting terms representing an extended version of the has-a relationship with the notion of terms assignable to a data set which provides a broader scope for the notion of the *is-a* relationship for data sets. Conceptually, a supporting term assignment provides evidence that a given data set might be assigned to a more specific term according to the *is-a* hierarchy due to one or more term assignments at the contained data item level supporting this assumption.

In step 304, a set of contextual term assignments CxTA may be determined. The set of contextual term assignments for a data set and its contained data items represents the impact of supporting relationships (derived from *is-a* and *has-a* relationships) on the combined confidence values for these data assets.

The set of contextual term assignments CxTA may be built such that for each dataset DS of the data collection and all data items DI in dataset DS the following term assignments may be added to CxTA:

<DS, TDS, CDS>, where CDS=(SF(DS, TDS)+ B1*AVG(C where <DI, TDI, C> is part of STA(DS, TDS))/(1+B1) for any term TDI, and <DI, TDI, CDI>, where <DI, TDI, C> is part of STA(DS, TDS) and CDI=(SF(DS, TDS)+B2*CONF(DS, TDS))/ (1+B2)>0.

TDS are assignable terms of the dataset DS. TDI are assignable terms of a data item DI. The confidence value CDI may not depend on confidence value C to prevent the contextual term assignment from just enforcing existing term assignments.

SF(DS, TDS) is a support factor that specifies the number of data items DI of the dataset DS that have terms assigned which are supporting terms of term TDS: SF(DS, TDS)= NUM(DI of DS where <DI, T, C> is part of STA(DS, TDS) for any T and C>0)/NUM(DI in DS).

B1 is a factor that defines the degree to which confidence values of data sets impact the confidence values of contained data items (e.g. a higher confidence value for the data set increases the confidence value of its data items). B1=1 may be an example value which may be referred to as a standard value. It means that the impact is the same as for the support factor.

B2 is a factor that defines the degree to which confidence values of data items impact confidence value of the data set containing them (e.g. a higher confidence value for a data item increases the confidence value of the data set containing it). B2=1 may be an example value which may be referred to value. It means that the impact is the same as for the support factor.

CONF(DS, T) is the confidence value for the assignment of term T to DS CONF(DS, T)=C if <DS, T, C> is part of CTA and 0 otherwise.

Since there is at most one <DI, T, C> in STA(DS) per data item DI in dataset DS the following holds: 0<=SF(DS)<=1 which ensures that the resulting confidence value stays within a correct range.

In step 305, the set of contextual term assignments CxTA may be added to the set of term assignments TA 157 or CTA in the metadata repository 153.

For example, the adding in step 305 may be performed such that for each combination of D and T where <D, T, C> is part of CxTA, <D, CL_ctx, T, MAXC> may be added to TA where MAXC=MAX(C for all <D, T, C> in CxTA) and MAXC>0. This copies the contextual term assignment with the maximum confidence value for a given asset name-term pair from the set of contextual term assignments to the set of term assignments serving as input to the contextual classifier.

Figure 4A:
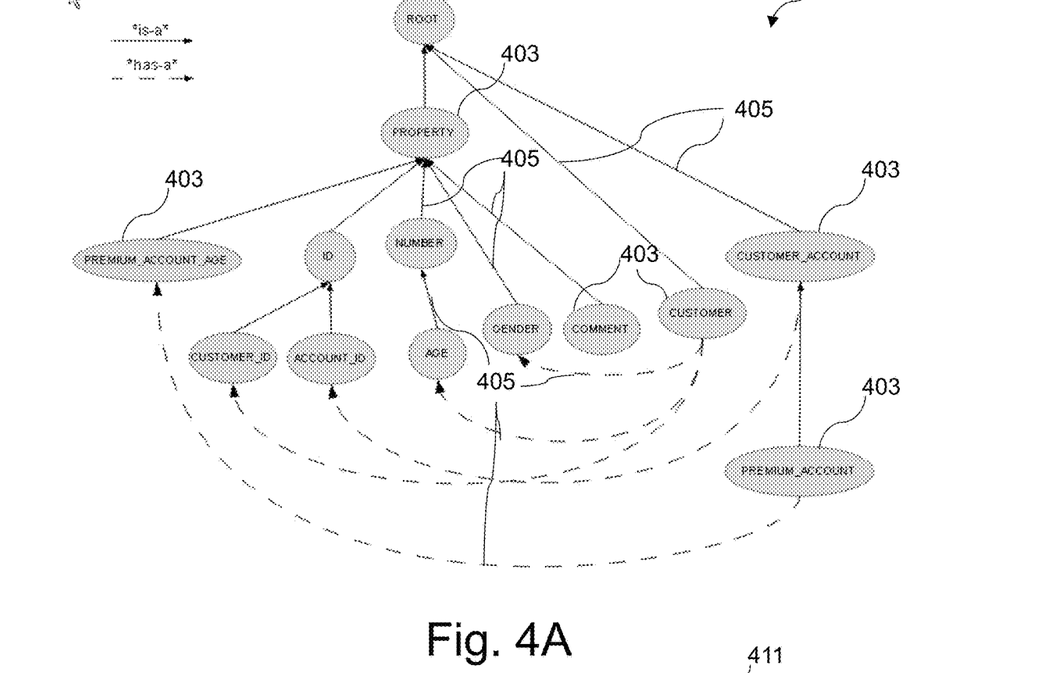
FIG. 4A depicts an example of a representation scheme in accordance with an embodiment of the present invention.

FIG. 4A depicts an example of a hierarchical representation scheme in accordance with the present disclosure. The representation scheme may be a hierarchical tree structure 401.

The hierarchical tree structure 401 comprises nodes 403 comprising terms CUSTOMER, PREMIUM_ACCOUNT, CUSTOMER_ACCOUNT, PROPERTY, ID, AGE, NUMBER, GENDER, COMMENT, CUSTOMER_ID, ACCOUNT_ID, PREMIUM_ACCOUNT_AGE and CUSTOMER_ACCOUNT. Edges 405 of the hierarchical tree structure 401 indicate the relationships between terms 403. In this example, the relationships between the terms are is-a and has-a relationships as indicated by solid and doted lines respectively. The relationships between the terms 403 are as follows.

CUSTOMER *is-a* ROOT
CUSTOMER_ACCOUNT *is-a* ROOT
PREMIUM_ACCOUNT *is-a* CUSTOMER_ACCOUNT
PROPERTY *is-a* ROOT
ID *is-a* PROPERTY
AGE *is-a* NUMBER
NUMBER *is-a* PROPERTY
GENDER *is-a* PROPERTY
COMMENT *is-a* PROPERTY
PREMIUM_ACCOUNT_AGE *is-a* PROPERTY
CUSTOMER_ID *is-a* ID
ACCOUNT_ID *is-a* ID
CUSTOMER *has-a* CUSTOMER_ID
CUSTOMER *has-a* GENDER
CUSTOMER *has-a* AGE
CUSTOMER_ACCOUNT *has-a* ACCOUNT_ID
PREMIUM_ACCOUNT *has-a* PREMIUM_ACCOUNT_AGE The hierarchical tree structure 401 may be used in accordance with the present method for refining classification of data. Assuming for example that the data collection to be classified using the hierarchical tree structure 401 may be a data table 'CUST' having columns ID, GENDER, AGE, COMMENT. And that the following two classifiers (e.g. forming the at least one classifier of step 201) may be used: {MC1, DC1} where MC1 is a metadata based classifier and DC1 is a data-based classifier.

The weight of each of the classifiers is W(CL_1)=W(MC1)=W(DC1)=⅓. All three classifiers contribute equally to the result. Confidence values are rounded to 3 digits after the decimal point. The classifier CL_1 refers to the contextual classifier that may be applied as described below with first to fifth steps.

The classifiers MC1 and DC1 may first be applied to the table CUST and columns resulting in the following term assignments:

TA = { <CUST, MC1, CUSTOMER, 0.8>,
    <CUST, MC1, CUSTOMER_ACCOUNT, 0.5>,
    <ID, DC1, ID, 0.9>,
    <ID, MC1, ID, 1.0>,
    <GENDER, DC1,GENDER,0.8>,
    <GENDER, MC1,GENDER,1.0>,
    <AGE, DC1, NUMBER, 0.6>,
    <AGE, MC1, AGE, 1.0>,
    <AGE, MC1, PREMIUM_ACCOUNT_AGE, 0.5> }

After applying the classifiers MC1 and DC1, combined term assignments may be computed as described above (e.g. in combination step 202) using for example the weight of each of the classifiers. This may result in the following combined term assignments CTA:

CTA = { <CUST, CUSTOMER, 0.8>,
    <CUST, CUSTOMER_ACCOUNT, 0.5>,
    <ID, ID,0.9>,
    <GENDER, GENDER,0.9>,
    <AGE, NUMBER, 0.6>, <AGE, AGE, 1.0>,
    <AGE,PREMIUM_ACCOUNT_AGE, 0.5> }

Figure 4B:
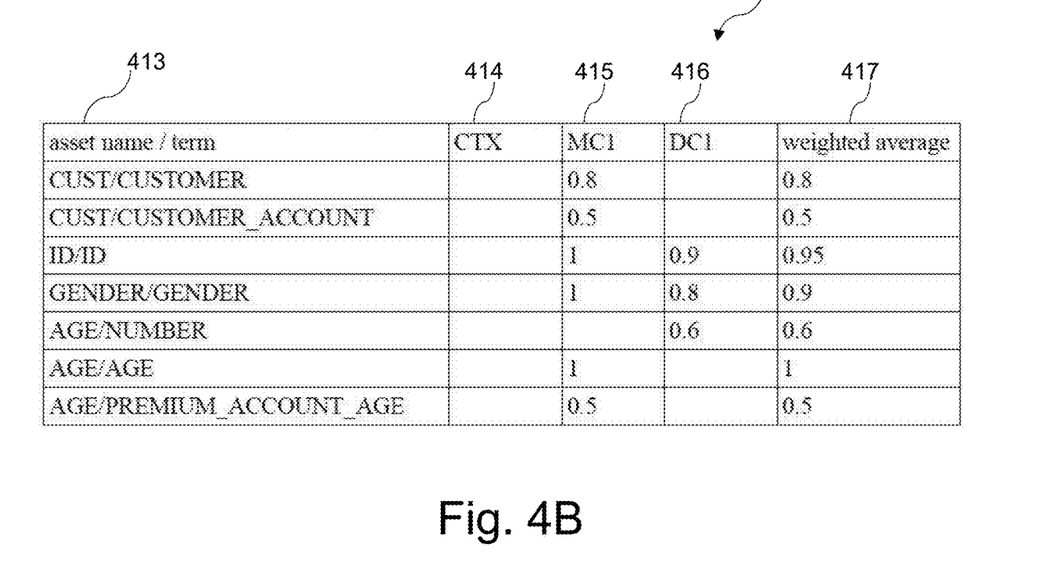
FIG. 4B is a table comprising pairs of data and assigned terms and associated confidence values in accordance with an embodiment of the present invention.

Table 411 of FIG. 4B indicates the confidence values for terms assignments TA and confidence values for combined term assignments CTA as weighted average values. Table 411 comprises column 413 indicating the pair of data and term assigned to data. For example, the first value of column 413 indicates that data table CUST is assigned term CUSTOMER. Columns 415-416 indicate the confidence values for the classifiers MC1 and DC1. Column 414 may comprise confidence values as calculated by the contextual classifier in accordance with the present disclosure. Column 417 comprises confidence values of the combined term assignments CTA as weighted average values.

The resulting set of term assignments from the application of the classifiers MC1 and DC1 as summarized in table 411 may be refined as described below with steps first to fifth steps. First to fifth steps provide example implementations of steps 301-305 of FIG. 3 respectively.

In a first step, supporting terms may be computed and the resulting supporting terms are the following. The supporting terms may be computed for each term of the hierarchical tree structure or may be computed for the assignable terms resulting from the second step.

ST(PREMIUM_ACCOUNT) = { ACCOUNT_ID,
PREMIUM_ACCOUNT_AGE },
ST(CUSTOMER_ACCOUNT) = { ACCOUNT_ID }, and
ST(CUSTOMER) = { CUSTOMER_ID, GENDER, AGE }.

In a second step, the sets of assignable terms may be computed for the data table CUST resulting in: AT(CUST)= {CUSTOMER, CUSTOMER_ACCOUNT, PREMIUM_ACCOUNT}. The AT(CUST) may be determined as follows. It may be determined that CUSTOMER is a term assigned to the table CUST using the results of classification of MC1 and DC1. Based on the term CUSTOMER subterms of CUSTOMER and subterms of ROOT may be identified (in the tree 401) as assignable terms of table CUST. CUSTOMER has no subterms in the hierarchical tree structure 401 and only ROOT has subterms: CUSTOMER_ACCOUNT and PREMIUM_ACCOUNT. This results in the above content of AT(CUST).

In a third step, supporting term assignments STA(CUST, T) may be computed for data table CUST using the results of the first and second steps. STA(CUST, T) is the set of term assignments <DI_j, T, C> where D_j is a data item of the table CUST ant thus D_j is one of the columns{ID, GENDER, AGE, COMMENT} and T is part of ST(A) and A is part of AT(CUST) and C=JC(DI_j, T). JC(DI_j, T) may be computed as described above. The resulting supporting term assignments STA(CUST, T) are as follows.

STA(CUST, CUSTOMER_ACCOUNT)={<ID, ACCOUNT_ID, 0.95>} since CUSTOMER_ACCOUNT is in AT(CUST) and ACCOUNT_ID is in ST(CUSTOMER_ACCOUNT) and JC3(ID, ACCOUNT_ID)=0.95 (due to: <ID, ID, 0.95> in CTA and ACCOUNT_ID is-a ID).

STA(CUST, CUSTOMER)={<AGE, AGE, 1.0>, <GENDER, GENDER, 0.9>, <ID, CUSTOMER_ID, 0.95>} (due to: <ID, ID, 0.95> in CTA and CUSTOMER_ID is-a ID).

STA(CUST, PREMIUM_ACCOUNT={<ID, ACCOUNT_ID, 0.95>, <AGE, PREMIUM_ACCOUNT_AGE, 0.5>}.

In a fourth step, a set of contextual term assignments may be determined as follows. For that, the support factor may be determined for table CUST. The support factor as described above may require the number of data items in table CUST: NUM(DI, CUST). Since CUST has 4 columns, the 4 columns may be data items of the table CUST. Thus, NUM(DI, CUST)=4. The supporting factor may thus be obtained as follows.

SF(CUST, CUSTOMER)=¾=0.75 since CUST has 4 columns and STA(CUST, CUSTOMER) contains 3 elements, SF(CUST, PREMIUM_ACCOUNT)=2/4=0.5 since CUST has 4 columns and STA(CUST, PREMIUM_ACCOUNT) contains 3 elements, and SF(CUST, CUSTOMER_ACCOUNT)=¼=0.25 since CUST has 4 columns and STA(CUST, CUSTOMER_ACCOUNT) contains only one element.

With B1 set to 1, the contextual term assignments for CUST are as follows: <CUST, CUSTOMER, (0.75+1*(1+0.9+0.95)/3)/2>=<CUST, CUSTOMER, 0.85>

<CUST, PREMIUM_ACCOUNT, (0.5+1*(0.95+0.5)/2)/2>=<CUST, PREMIUM_ACCOUNT, 0.613>, and
<CUST, CUSTOMER_ACCOUNT, (0.25+1*0.95)/2>=<CUST, CUSTOMER_ACCOUNT, 0.6>.

For determining the contextual term assignments for data items of CUST, the confidence values for assigning the assignable terms to data table CUST may be determined as described above to obtain CONF(CUST, CUSTOMER)=0.8, CONF(CUST, PREMIUM_ACCOUNT)=0 and CONF(CUST, CUSTOMER_ACCOUNT)=0.5.

With B2 set to 1 the contextual term assignments for data items DI in table CUST are as follows.

For term TDS=CUSTOMER: the contextual term assignments are <AGE, AGE, 0.775>, <GENDER, GENDER, 0.775>, <ID, CUSTOMER_ID, 0.775> since (SF(CUST, CUSTOMER+CONF(CUST, CUSTOMER))/2=(0.75+0.8)/2=0.775.

For term PREMIUM_ACCOUNT, the contextual term assignments are <AGE, PREMIUM_ACCOUNT_AGE, 0.25>, <ID, ACCOUNT_ID, 0.25> since (SF(CUST, PREMIUM_ACCOUNT)+CONF(CUST, PREMIUM_ACCOUNT))/2=(0.5+0)/2=0.25.

For term CUSTOMER_ACCOUNT, the contextual term assignments comprise <ID, ACCOUNT_ID, 0.375> since (SF(CUST, CUSTOMER_ACCOUNT)+CONF(CUST, CUSTOMER_ACCOUNT))/2=(0.5+0.25)/2=0.375.

In a fifth step, contextual term assignments may be added to metadata repository 153. The following contextual term assignments are added to TA: <CUST, CL_ctx, CUSTOMER, 0.85>, <CUST, CL_ctx, PREMIUM_ACCOUNT, 0.613>, <CUST, CL_ctx, CUSTOMER_ACCOUNT, 0.6>, <AGE, CL_ctx, AGE, 0.775>, <GENDER, CL_ctx, GENDER, 0.775>, <ID, CL_ctx, CUSTOMER_ID, 0.775>, <AGE, CL_ctx, PREMIUM_ACCOUNT_AGE, 0.25>, <ID, CL_ctx, ACCOUNT_ID, 0.375>

Note that <ID, ACCOUNT_ID, 0.25> is not added in favor of <ID, ACCOUNT_ID, 0.375> which assigns the same term to the same data asset with higher confidence.

Figure 4C:
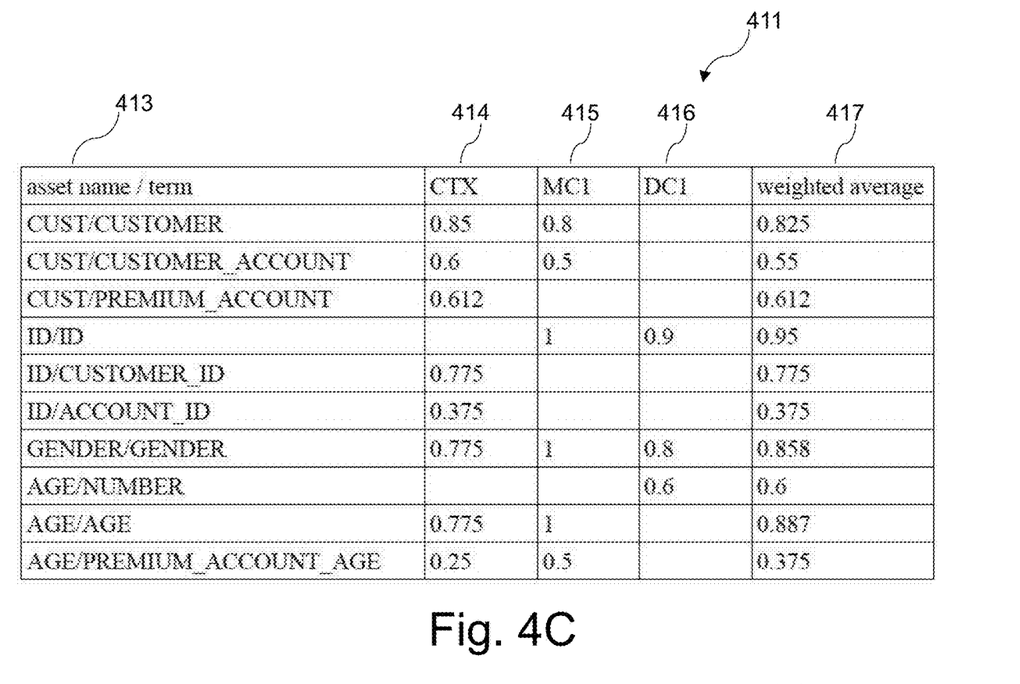
FIG. 4C is the table of FIG. 4B indicating the evolution of the table content in accordance with an embodiment of the present invention.

After completion of the contextual classifier and computation of CTA based on weighted average, the content of the table 411 becomes as indicated in FIG. 4C.

Figure 4D:
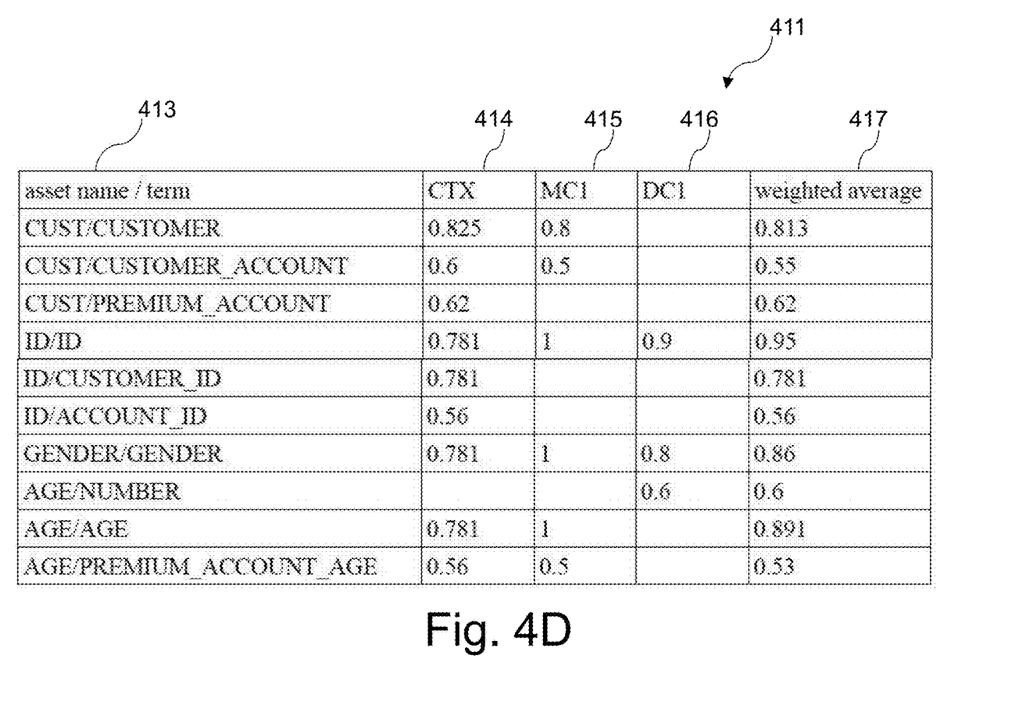
FIG. 4D is the table of FIG. 4C indicating the evolution of the table content in accordance with an embodiment of the present invention.

Upon adding the contextual term assignments to metadata repository 153 they may form a modified set of term assignments TA e.g. the TA that resulted from the application of DC1 and MC1 plus the contextual term assignments form the modified TA. The modified TA may be processed (combination step) again in order to generate (updated) combined term assignments CTA and based on first to fifth steps may be repeated using the updated combined term assignments CTA. The table of FIG. 4D is obtained after repeating the combination step (e.g. step 202) and refining step (e.g. first to fifth steps) for a predefined number of times.

In another example, a method for classifying data stored in a data table is provided. The method comprises: providing an ontology describing terms and the hierarchy of the terms; applying at least one classifier on the data table, resulting in a set of term assignments, each term assignment associating a term candidate with a respective confidence value to the table or one of its columns; refining at least one of the term assignments based on the ontology and the set of term assignments.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for classifying a data collection of data of a predefined domain, wherein the data collection comprises a collection of one or more data sets comprising data items, wherein the one or more data sets comprise one or more tables or files represented by a database or a directory, the computer program product comprising a computer readable storage medium having program code embodied therewith, the program code comprising programming instructions for:

providing a hierarchical representation scheme describing terms of the domain and one or more relationships between the terms;

applying at least one classifier on the data collection, resulting in a set of term assignments, each term assignment of the term assignments associating a term candidate with a respective confidence value to the collection or to one or more of the data items of the collection, wherein each term assignment of the term assignments is structured in a form of a tuple that indicates data of the data collection that is processed or classified, a classifier being applied, the term candidate assigned to the data processed or classified and the associated confidence value; and refining at least one of the term assignments based on the representation scheme and the set of term assignments.

2. The computer program product as recited in claim 1, wherein the refining comprises:

using the term candidate assigned to the collection for determining a set of assignable terms to the collection from the representation scheme;

determining from the representation scheme supporting terms (ST) that are related to the assignable terms;

identifying each data item of the collection that can be assigned to a term of the supporting terms using the set of term assignments, and providing a set of term assignments of the identified data items; and refining the term assignments of one or more of the collection and the data items using the set of term assignments of the identified data items.

3. The computer program product as recited in claim 2, wherein determining supporting terms of a given assignable term comprises:

determining first set of terms comprising terms having a parent inheritance relationship with the given assignable term, the first set of terms further comprises the assignable term and for each first term of the first set determining a second set of terms related to the first term by an associative relationship, wherein the supporting terms comprise the second sets of terms.

4. The computer program product as recited in claim 3, wherein the parent inheritance relationship is a single inheritance relation being an is-a relationship.

5. The computer program product as recited in claim 3, wherein the associative relationship indicates that the first term has an has-a relationship with a second term.

6. The computer program product as recited in claim 2, wherein the set of assignable terms comprises the term candidate and terms having a child inheritance relationship with the term candidate.

7. The computer program product as recited in claim 2, wherein the at least one classifier comprises multiple classifiers, wherein the program code further comprises the programming instructions for:

identifying in the set of term assignments a subset of term assignments having each a same given data and same given term assigned to the given data, combining the confidence values of the subset of term assignments for providing a combined term assignment assigning the given term to the given data with the combined confidence value, wherein the refining is performed on at least part of the combined term assignments.

8. The computer program product as recited in claim 1, wherein the representation scheme comprises an ontology tree providing an ontology of the domain describing the terms and the hierarchy of the terms.

9. The computer program product as recited in claim 1, wherein the at least one classifier comprises multiple classifiers, wherein the program code further comprises the programming instructions for:

identifying in the set of term assignments a subset of term assignments having each a same given data and same given term assigned to the given data, combining the confidence values of the subset of term assignments for providing a combined term assignment assigning the given term to the given data with the combined confidence value, wherein the refining is performed on the combined term assignment.

10. The computer program product as recited in claim 9, wherein combining the confidence values comprises: assigning a weight to a classifier of a respective term assignment of the subset of term assignments and performing a sum of the confidence values weighted by respective weights and divided by the number of summed confidence values.

11. A system, comprising:

a memory unit for storing a computer program for classifying a data collection of data of a predefined domain, wherein the data collection comprises a collection of one or more data sets comprising data items, wherein the one or more data sets comprise one or more tables or files represented by a database or a directory; and a processor coupled to the memory unit, wherein the processor is configured to execute program instructions of the computer program comprising:

providing a hierarchical representation scheme describing terms of the domain and one or more relationships between the terms;

applying at least one classifier on the data collection, resulting in a set of term assignments, each term assignment of the term assignments associating a term candidate with a respective confidence value to the collection or to one or more of the data items of the collection, wherein each term assignment of the term assignments is structured in a form of a tuple that indicates data of the data collection that is processed or classified, a classifier being applied, the term candidate assigned to the data processed or classified and the associated confidence value; and refining at least one of the term assignments based on the representation scheme and the set of term assignments.

12. The system as recited in claim 11, wherein the refining comprises:

using the term candidate assigned to the collection for determining a set of assignable terms to the collection from the representation scheme;

determining from the representation scheme supporting terms (ST) that are related to the assignable terms;

identifying each data item of the collection that can be assigned to a term of the supporting terms using the set of term assignments, and providing a set of term assignments of the identified data items; and refining the term assignments of one or more of the collection and the data items using the set of term assignments of the identified data items.

13. The system as recited in claim 12, wherein determining supporting terms of a given assignable term comprises:

determining first set of terms comprising terms having a parent inheritance relationship with the given assignable term, the first set of terms further comprises the assignable term and for each first term of the first set determining a second set of terms related to the first term by an associative relationship, wherein the supporting terms comprise the second sets of terms.

14. The system as recited in claim 13, wherein the parent inheritance relationship is a single inheritance relation being an is-a relationship.

15. The system as recited in claim 13, wherein the associative relationship indicates that the first term has an has-a relationship with a second term.

16. The system as recited in claim 12, wherein the set of assignable terms comprises the term candidate and terms having a child inheritance relationship with the term candidate.

17. The system as recited in claim 12, wherein the at least one classifier comprises multiple classifiers, wherein the program instructions of the computer program further comprise:
   identifying in the set of term assignments a subset of term assignments having each a same given data and same given term assigned to the given data, combining the confidence values of the subset of term assignments for providing a combined term assignment assigning the given term to the given data with the combined confidence value, wherein the refining is performed on at least part of the combined term assignments.

18. The system as recited in claim 11, wherein the representation scheme comprises an ontology tree providing an ontology of the domain describing the terms and the hierarchy of the terms.

19. The system as recited in claim 11, wherein the at least one classifier comprises multiple classifiers, wherein the program instructions of the computer program further comprise:
   identifying in the set of term assignments a subset of term assignments having each a same given data and same given term assigned to the given data, combining the confidence values of the subset of term assignments for providing a combined term assignment assigning the given term to the given data with the combined confidence value, wherein the refining is performed on the combined term assignment.

20. The system as recited in claim 19, wherein combining the confidence values comprises: assigning a weight to a classifier of a respective term assignment of the subset of term assignments and performing a sum of the confidence values weighted by respective weights and divided by the number of summed confidence values.

* * * * *